(12) United States Patent
Morishita et al.

(10) Patent No.: US 10,897,184 B2
(45) Date of Patent: Jan. 19, 2021

(54) ROTATING ELECTRIC MACHINE (71) Applicant: DENSO CORPORATION, Kariya (JP)

(72) Inventors: Kazuki Morishita, Kariya (JP); Takuya Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/560,126

(22) Filed: Sep. 4, 2019

(65) Prior Publication Data

US 2019/0393760 A1    Dec. 26, 2019

Related U.S. Application Data

(63) Continuation of application No. PCT/JP2018/006566, filed on Feb. 22, 2018.

(30) Foreign Application Priority Data

Mar. 7, 2017   (JP) .................... 2017-042703

(51) Int. Cl.
| | |
|---|---|
| *H02K 11/00* | (2016.01) |
| *H02K 11/04* | (2016.01) |
| *H02K 1/27* | (2006.01) |
| *H02K 5/08* | (2006.01) |
| *H02K 9/18* | (2006.01) |
| *H02K 11/042* | (2016.01) |

(52) U.S. Cl.
CPC ......... *H02K 11/046* (2013.01); *H02K 1/2706* (2013.01); *H02K 5/08* (2013.01); *H02K 9/18* (2013.01); *H02K 11/042* (2013.01)

(58) Field of Classification Search
CPC .... H02K 11/046; H02K 5/225; H02K 11/042; H02K 11/048; H02K 5/18; H02K 9/20; H02K 5/08; H02K 9/18
USPC .................. 310/68 D, 64, 68 R, 71, 89, 310
See application file for complete search history.

(56) References Cited

U.S. PATENT DOCUMENTS

| | | | | |
|---|---|---|---|---|
| 6,034,452 A | * | 3/2000 | Nakamura ........... | H02K 11/046 310/43 |
| 7,348,700 B2 | * | 3/2008 | Sugitani ................... | H02K 5/10 310/232 |
| 7,449,806 B2 | * | 11/2008 | Hamada ............... | H02K 11/046 310/58 |
| 8,531,069 B2 | * | 9/2013 | Amaral ................ | H02K 11/046 310/68 D |

(Continued)

*Primary Examiner* — Thanh Lam
(74) *Attorney, Agent, or Firm* — Oliff PLC (57) ABSTRACT

In a rotating electric machine, a rectifier includes a positive electrode side member including a positive electrode side rectification element connected to a power supply side, and a positive electrode side heat sink to which the rectification element is fixed. The positive electrode side heat sink is disposed to face a non-positive electrode side member having a potential difference with respect to the positive electrode side heat sink with a gap therebetween. An insulating cover provided to cover the rectifier has a wall portion extending in a direction in which the positive electrode side heat sink and the non-positive electrode side member are arranged. The wall portion functions as an easily deformable portion that, when the insulating cover is deformed by an external force, contacts with the non-positive electrode side member and enters the gap between the positive electrode side heat sink and the non-positive electrode side member.

20 Claims, 9 Drawing Sheets

(56) References Cited

U.S. PATENT DOCUMENTS 9,369,032 B2* 6/2016 Kimata ............... H02K 11/046
2014/0246959 A1 9/2014 Kimata et al.

* cited by examiner

ROTATING ELECTRIC MACHINE

CROSS REFERENCE TO RELATED APPLICATION

The present application is based on Japanese Application No. 2017-042703, filed on Mar. 7, 2017, the contents of which are incorporated herein by reference.

BACKGROUND

Technical Field

The present disclosure relates to a rotating electric machine.

Background Art

In recent years, there is an increasing need to improve the safety against collision of, for example, a vehicle. In a rotating electric machine, a rectifier is a member having an electric potential. Thus, a structure for preventing a short circuit when an external force is applied due to collision of a vehicle or the like is required.

SUMMARY

The present disclosure provides a rotating electric machine that includes a rectifier and an insulating cover that covers the rectifier. The rectifier includes a positive electrode side member that includes: a positive electrode side rectification element connected to a power supply side; and a positive electrode side heat sink to which the positive electrode side rectification element is fixed and charged positively. The positive electrode side heat sink is disposed so as to face a non-positive electrode side member with a gap between the positive electrode side heat sink and the non-positive electrode side member. The non-positive electrode side member has a potential difference with respect to the positive electrode side heat sink. The insulating cover includes at least one wall portion that extends in a direction in which the positive electrode side heat sink and the non-positive electrode side member are arranged. The at least one wall portion functions as at least one easily deformable portion that, when the insulating cover is deformed by an external force, contacts with the non-positive electrode side member and enters the gap between the positive electrode side heat sink and the non-positive electrode side member.

BRIEF DESCRIPTION OF THE DRAWINGS

The present disclosure will be further clarified through the detailed description below, with reference to the accompanying drawings. In the drawings.

DESCRIPTION OF THE EMBODIMENTS

A technique is disclosed in Japanese Patent Publication No. 5795086, in which a partition unit is provided inside a rear cover provided in the rotating electric machine and extends so as to separate metal parts having a potential difference. The partition unit formed integrally in the cover makes it possible to increase the rigidity and the strength of the entire rear cover, and the impact resistance can be improved. In the technique described in Japanese Patent Publication No. 5795086, if an external force is applied to the rotating electric machine and the rectifier gets damaged, members having a potential difference in the rectifier may contact with each other and cause a short circuit to occur. It is thus desired to provide a rotating electric machine capable of taking appropriate measures against a short circuit in the rectifier.

An exemplary embodiment provides a rotating electric machine that includes: a rotor fixed to a rotation shaft; a stator for generating an alternating current as the rotor rotates; a frame member for holding the rotor and the stator; a rectifier fixed to an outer side of the frame member and constituting a rectification circuit that rectifies the alternating current generated by the stator; and an insulating cover provided so as to cover the rectifier.

The rectifier includes a positive electrode side member that includes: a positive electrode side rectification element connected to a power supply side; and a positive electrode side heat sink to which the positive electrode side rectification element is fixed and charged positively.

The positive electrode side heat sink is disposed so as to face a non-positive electrode side member having a potential difference with respect to the positive electrode side heat sink with a gap therebetween.

The insulating cover includes at least one wall portion that extends in a direction in which the positive electrode side heat sink and the non-positive electrode side member are arranged. The at least one wall portion functions as at least one easily deformable portion that, when the insulating cover is deformed by an external force, contacts with the non-positive electrode side member and enters the gap between the positive electrode side heat sink and the non-positive electrode side member.

In a rotating electric machine in which the rectifier and the insulating cover are provided on the outer side of the frame member, when an external force is applied to the insulating cover, the rectifier may be deformed together with the insulating cover. This may cause members of the rectifier having a potential difference to come in contact with each other and cause a short circuit.

According to the exemplary embodiment, in the insulating cover, the wall portion extends in the direction in which the positive electrode side heat sink and the non-positive electrode side member are arranged. The at least one wall portion functions as at least one easily deformable portion. When the insulating cover is deformed by an external force, the easily deformable portion hits the non-positive electrode side member and enters the gap between the positive electrode side heat sink and the non-positive electrode side member. This makes it possible to suppress a short circuit due to contact between members having a potential difference. As a result, it is possible to properly take measures against a short circuit in the rectifier.

In the exemplary embodiment, the easily deformable portion and the non-positive electrode side member may be configured such that a force applied from a base end side (root side) of the easily deformable portion following application of an external force to the insulating cover causes a force toward the gap between the positive electrode side heat sink and the non-positive electrode side member at a tip end portion of the easily deformable portion.

According to the above configuration, when an external force is applied to the insulating cover and a force is applied to the easily deformable portion from its base end side, this force generates a force toward the gap between the positive electrode side heat sink and the non-positive electrode side member at the tip end portion of the easily deformable portion. Specifically, a rotational force is generated in the easily deformable portion toward the gap between the positive electrode side heat sink and the non-positive electrode side member, and around the base end portion of the easily deformable portion. As a result, when the insulating cover is deformed by an external force, the easily deformable portion properly enters the gap between the positive electrode side heat sink and the non-positive electrode side member.

In the exemplary embodiment, the non-positive electrode side member may have an inclined guide unit that guides a tip end portion of the easily deformable portion into the gap between the positive electrode side heat sink and the non-positive electrode side member.

In the above configuration, when the insulating cover is deformed, the tip end portion of the easily deformable portion is guided into the gap between the positive electrode side heat sink and the non-positive electrode side member by the inclined guide unit of the non-positive electrode side member. Thus, proper insulation can be implemented in the rectifier. It is preferable that an opposing face of the non-positive electrode side member opposing the insulating cover is an inclined face that is inclined such that the outer side thereof is closer to the tip end portion of the easily deformable portion than the inner side thereof.

In the exemplary embodiment, the tip end portion of the easily deformable portion may be provided with a tip end slope for guiding the easily deformable portion into the gap between the positive electrode side heat sink and the non-positive electrode side member.

In the above configuration, when the insulating cover is deformed, the easily deformable portion is guided into the gap between the positive electrode side heat sink and the non-positive electrode side member by the tip end slope of the easily deformable portion. Thus, proper insulation can be implemented in the rectifier.

In the exemplary embodiment, the insulating cover may have a top plate facing the positive electrode side heat sink and fixed by a fixing unit. When an external force is applied to the insulating cover, the top plate will be deformed on the outer side of the fixing position of the fixing unit, and thus the easily deformable portion will be inclined toward the inside of the insulating cover.

In the configuration in which the top plate is fixed by the fixing unit in the insulating cover, when the insulating cover is deformed by an external force, the top plate will be deformed on the outer side of the fixing position of the fixing unit, and this deformation is expected to cause the easily deformable portion to incline toward the inside of the insulating cover. In this case, since the positive electrode side heat sink and the non-positive electrode side member are present on the inner side of the wall portion, the easily deformable portion can be properly inserted between the positive electrode side heat sink and the non-positive electrode side member.

In the exemplary embodiment, the easily deformable portion may be a flat plate-like portion. If the easily deformable portion has a plate-like form that is curved in the circumferential direction, the orientation of the easily deformable portion may differ depending on the position within it in the width direction, which may hinder the deformation of the easily deformable portion. In the above configuration, since the easily deformable portion is a flat plate-like portion, the deformation of the easily deformable portion is less likely to be hindered. As a result, a short circuit of the positive electrode side heat sink and the non-positive electrode side member can be prevented as desired.

In the exemplary embodiment, the insulating cover may include a peripheral wall that includes the easily deformable portion. In the above configuration, since the easily deformable portion is provided as a part of the peripheral wall, as compared with the configuration in which the easily deformable portion is provided inside the cover, a factor that obstructs the flow of cooling air that has entered the cover can be reduced, and thus a decrease in the cooling performance of the rectifier can be suppressed.

In the exemplary embodiment, the non-positive electrode side member and the tip end of the easily deformable portion may be separated from each other by a gap therebetween that forms a vent. In the above configuration, in a state where the insulating cover is not deformed, the non-positive electrode side member and the tip end of the easily deformable portion are separated from each other, and cooling air would be taken into the insulating cover through the vent therebetween. As a result, the cooling performance of the rectifier can be improved.

In the exemplary embodiment, the easily deformable portion may be a flat plate-like portion. Since the easily deformable portion is a flat plate-like portion, the deformation of the easily deformable portion is less likely to be hindered, and a short circuit of the positive electrode side heat sink and the non-positive electrode side member can be prevented as desired.

In the exemplary embodiment, the easily deformable portion may be a plurality of easily deformable portions that extend along a periphery of the insulating cover at different angles, and the plurality of easily deformable portions include first and second easily deformable portions, in which the first easily deformable portion may be at a certain distance from the second easily deformable portion in a direction orthogonal to the first easily deformable portion.

In the above configuration, the plurality of easily deformable portions that are flat plate-like portions extend along the periphery of the insulating cover at different angles, and the first easily deformable portion is at a certain distance from the second easily deformable portion in a direction orthogonal to the first easily deformable portion. In this case, when the first easily deformable portion is to be deformed along with deformation of the insulating cover, the second easily deformable portion would not hinder the deformation. Therefore, appropriate measures against a short circuit in the rectifier can be obtained.

In the exemplary embodiment, a wall portion that forms a part of the peripheral wall other than the plurality of easily deformable portions may be separated from the easily deformable portions in a circumferential direction, and is provided on an outer side of an outer peripheral surface of the frame member so as to extend along the outer peripheral surface.

In the above configuration, the wall portion of the peripheral wall other than the plurality of easily deformable portions in the circumferential direction of the insulating cover has a configuration different from that of the plurality of easily deformable portions, and it is provided on the outer side of the outer peripheral surface of the frame member so as to extend along the outer peripheral surface. In this case, although the plurality of easily deformable portions and the other wall portion are located on the outer side of the frame member so as to enclose the space in which the rectifier is accommodated, the wall portion other than the easily deformable portions would not contact with the frame member to hinder the deformation of the insulating cover, that is, hinder the deformation of the easily deformable portions.

In the exemplary embodiment, the rectifier may include a plurality of holding portions that extend in the direction in which the positive electrode side heat sink and the non-positive electrode side member are arranged and are configured to hold these two members with a certain distance therebetween. The wall portion of the peripheral wall other than the easily deformable portions may be provided at a position on an outer side of the holding portions. The easily deformable portions may be provided at positions on an outer side of positions between adjacent holding portions.

The positive electrode side heat sink and the non-positive electrode side member are held by the holding portions with a certain distance therebetween. In this case, there may be a difference in the possibility of the positive electrode side heat sink and the non-positive electrode side member contacting with each other between portions near the holding portions and the other portions, and it is likely that the possibility of contact is lower at the portions near the holding portions.

In this case, the wall portion of the peripheral wall other than the easily deformable portions is provided at a position on the outer side of the holding portions, and the easily deformable portions are provided at positions on the outer side of positions between adjacent holding portions. Thus, a configuration suitable as a peripheral wall of the insulating cover can be realized taking into consideration the difference in the possibility of contact of the non-positive electrode side member with the different portions of the positive electrode side heat sink.

In the exemplary embodiment, an inside wall may be provided on an inner side of the peripheral wall of the insulating cover. The inside wall may be an easily deformable portion that, when the insulating cover is deformed by an external force, contacts with the non-positive electrode side member and enters the gap between the positive electrode side heat sink and the non-positive electrode side member.

According to the above configuration, the inside wall serving as an easily deformable portion provided on the inner side of the peripheral wall of the insulating cover makes it possible to suppress occurrence of a short circuit due to contact between members having a potential difference. As a result, again, appropriate measures against a short circuit in the rectifier can be realized.

In the exemplary embodiment, the rectifier may include a negative electrode side member including a negative electrode side rectification element connected to a ground side, and a negative electrode side heat sink to which the negative electrode side rectification element is fixed. The negative electrode side member may be the non-positive electrode side member. When the insulating cover is deformed by an external force, a tip end portion of the wall portion on the side of the negative electrode side heat sink may contact with the negative electrode side heat sink and the easily deformable portion may enter the gap between the positive electrode side heat sink and the negative electrode side heat sink.

According to the above configuration, when the insulating cover is deformed by an external force, the tip end portion of the easily deformable portion hits the negative electrode side heat sink and enters the gap between the positive electrode side heat sink and the negative electrode side heat sink. In this case, a short circuit between the positive electrode side heat sink and the negative electrode side heat sink can be suitably suppressed.

In the exemplary embodiment, the negative electrode side heat sink may be configured by an opposing portion of the frame member opposing the positive electrode side heat sink. According to this configuration, since a part of the frame member can be used as the non-positive electrode side member, the configuration of the rotating electric machine can be simplified. Further, when the insulating cover is deformed by an external force, the tip end portion of the easily deformable portion hits the opposing portion of the frame member and enters the gap between the positive electrode side heat sink and the opposing portion. In this case, a short circuit between the positive electrode side heat sink and the opposing portion serving as the negative electrode side heat sink can be suitably suppressed.

In the exemplary embodiment, a heat dissipation rib may be formed on the back of a contact face of the negative electrode side heat sink with which the tip end portion of the easily deformable portion contacts. According to this configuration, since a heat dissipation rib is formed at a portion of the negative electrode side heat sink that contacts with the tip end portion of the easily deformable portion, the cooling performance of the negative electrode side rectification element can be improved.

An AC rotating electric machine for a vehicle according to an embodiment of the present disclosure will hereinafter be described, with reference to the drawings. The same or equivalent parts in the embodiments described below are assigned with the same reference number in the drawings, and an earlier explanation should be referred to regarding those parts having the same reference number as another.

Figure 1:
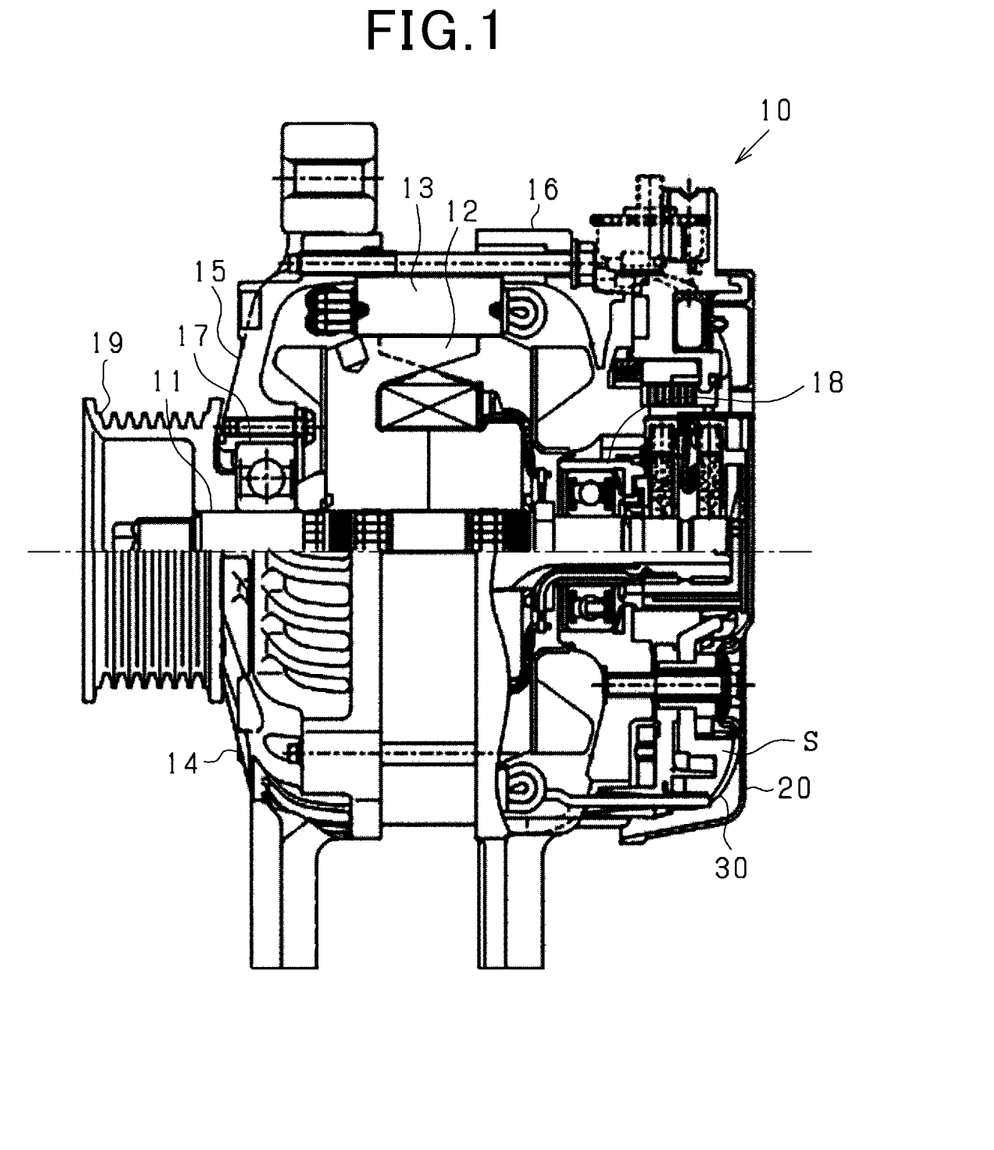
FIG. 1 is an axial cross-sectional view of a rotating electric machine according to an embodiment.

FIG. 1 is an axial cross-sectional view of a rotating electric machine 10. In FIG. 1, the rotating electric machine 10 is the so-called alternator that is linked to the output shaft of a vehicle engine (not shown) via a linking member such as a belt. The rotating electric machine 10 includes a Lundell rotor 12 fixed to a rotation shaft 11, a stator 13 provided so as to surround the rotor 12, and a metal frame 14 holding the rotor 12 and the stator 13. As is well known, the rotor 12 has a field coil and a pair of pole cores. The stator 13 has an annular stator core and a stator winding wound around the stator core.

The frame 14 includes a front frame 15 and a rear frame 16 that are arranged in the axial direction, and these frames 15 and 16 are united via fastening provided by through bolts. The stator 13 is fixed in a state where it is held between the front frame 15 and the rear frame 16. The frame 14 is provided with bearings 17 and 18. The rotation shaft 11 and the rotor 12 are rotatably supported by the bearings 17 and 18. A pulley 19 is attached on one end (front frame 15 side) of the rotation shaft 11.

A rear cover 20 formed of synthetic resin and serving as an insulating cover is attached on the outer side of the rear frame 16 in the axial direction. A rectifier 30 serves as a rectifier for rectifying the alternating current generated in the rotating electric machine 10. The rectifier 30 is accommodated in the space S formed between the rear frame 16 and the rear cover 20. The space S contains, in addition to the rectifier 30, a regulator and a field coil energization mechanism (not shown).

Figure 2:
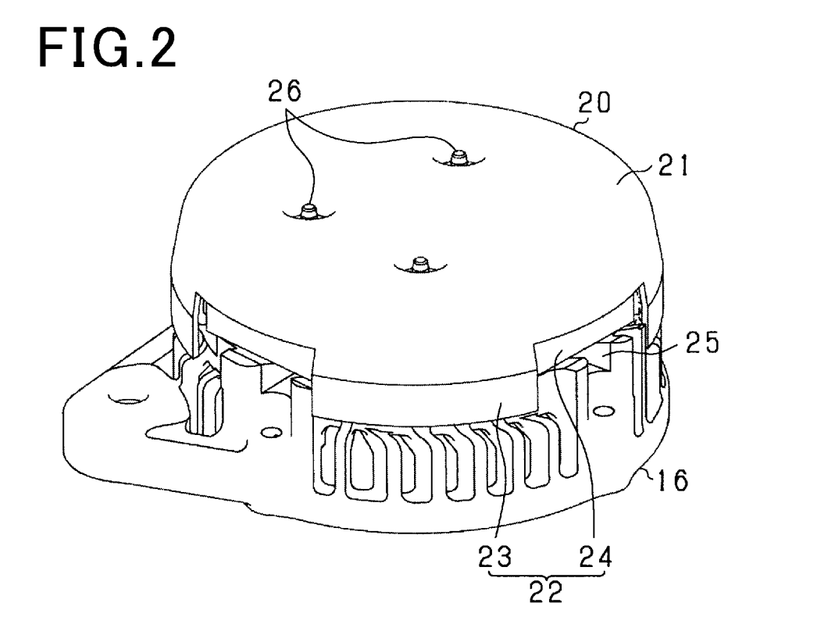
FIG. 2 is a perspective view showing the assembled state of a rear frame, a rear cover, and a rectifier of the rotating electric machine.
Figure 3:
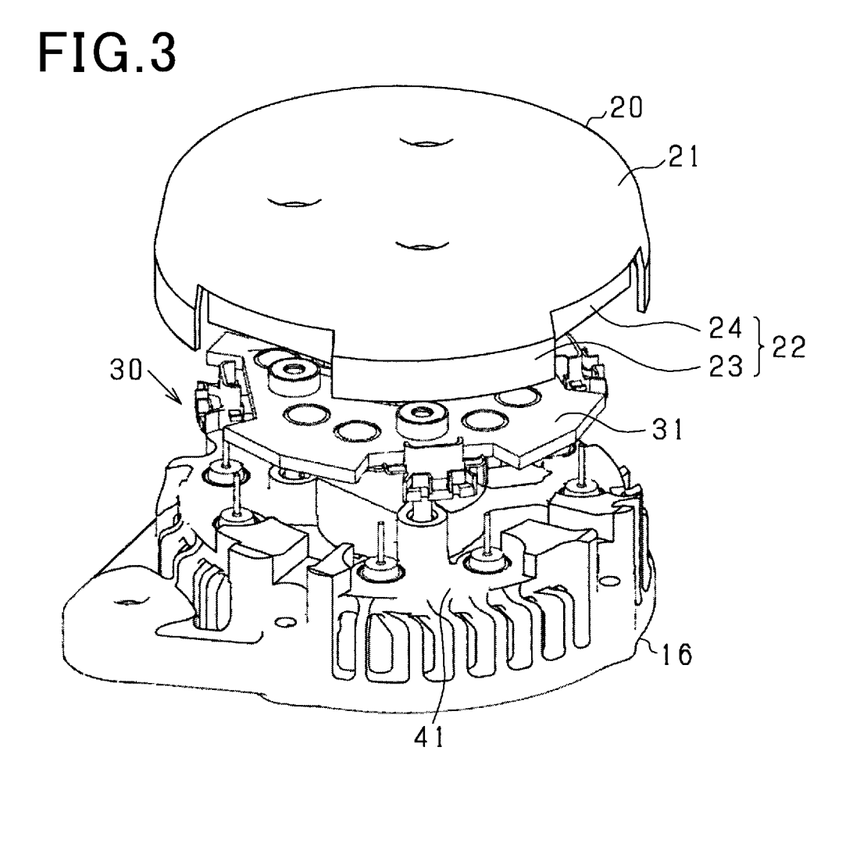
FIG. 3 is an exploded perspective view of the rear frame, the rear cover, and the rectifier.
Figure 4:
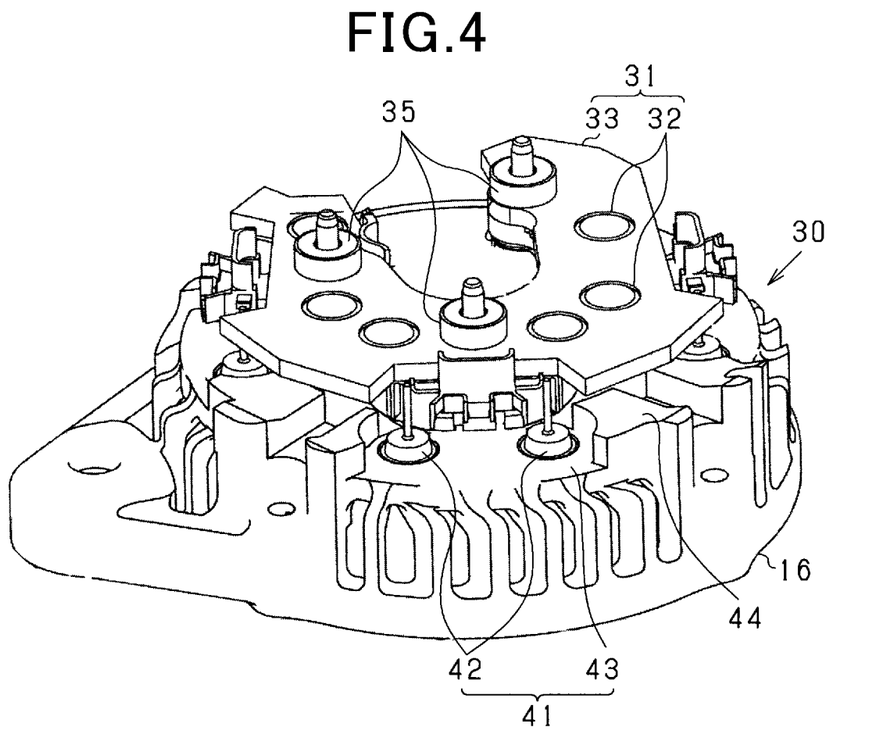
FIG. 4 is a perspective view showing an assembled state of the rear frame and the rectifier.

Next, the configurations of the rear cover 20 and the rectifier 30 that are fixed with respect to the rear frame 16 will be described in detail. FIG. 2 is a perspective view showing the assembled state of the rear frame 16, the rear cover 20, and the rectifier 30. FIG. 3 is an exploded perspective view of the rear frame 16, the rear cover 20, and the rectifier 30. FIG. 4 is a perspective view showing the assembled state of the frame 16 and the rectifier 30.

In the present embodiment, the adopted rotating electric machine 10 is one having a three-phase dual stator winding, and the number of phases of the stator winding is six. Therefore, the rectifier circuit forms a diode bridge circuit comprising a total of six parallel units corresponding to the six-phase current. However, alternatively, the rotating electric machine 10 may have a three-phase alternating current configuration.

The rectifier 30 includes a positive electrode side member 31 provided on the axially outer side of the rear frame 16 and a negative electrode side member 41 configured using a part of the rear frame 16. The positive electrode side member 31 and the negative electrode side member 41 are separated from each other by a gap therebetween.

In the present embodiment, the negative electrode side member 41 corresponds to the non-positive electrode side member. The positive electrode side member 31 includes a plurality of positive electrode side diodes 32 connected to the power supply (battery) side of the rectification circuit, and a positive electrode side heat sink 33 to which the positive electrode side diodes 32 are fixed. The positive electrode side diodes 32 correspond to a positive side rectification element, and they may be formed of, for example, Zener diodes. The positive electrode side heat sink 33 is made of a metal material, and is positively charged by being electrically connected between the positive electrode side diodes 32 and the power supply unit.

The negative electrode side member 41 includes the negative electrode side diodes 42 connected to the ground side of the rectification circuit, and the negative electrode side heat sink 43 to which the negative electrode side diodes 42 are fixed. The negative electrode side diodes 42 correspond to a negative side rectification element, and they may be formed of, for example, Zener diodes. The negative heat sink 43 is a part of the rear frame 16, and it is also an opposing portion that opposes the positive electrode side heat sink 33. The negative electrode side heat sink 43, that is, the rear frame 16 is at the ground potential, and therefore has a potential difference with respect to the positive electrode side heat sink 33.

Figure 5:
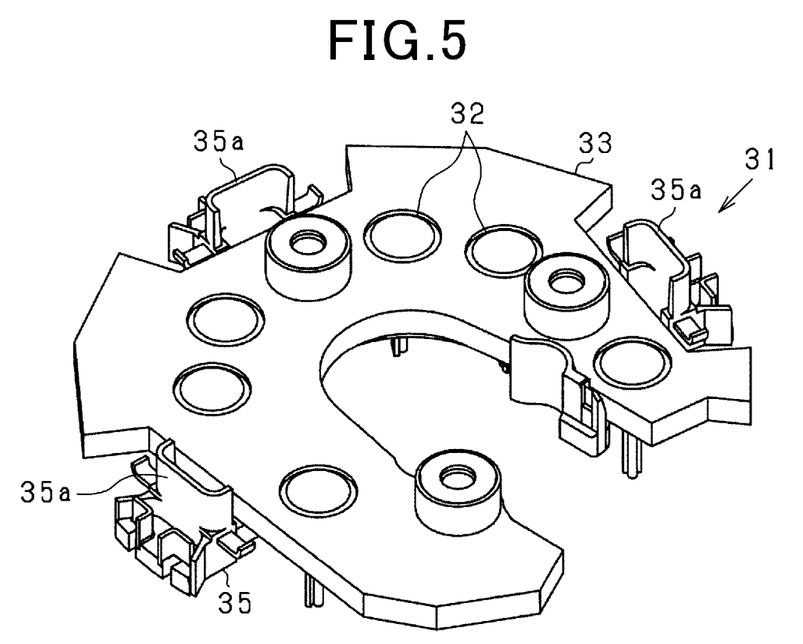
FIG. 5 is a perspective view of a positive electrode side member of the rectifier.
Figure 8:
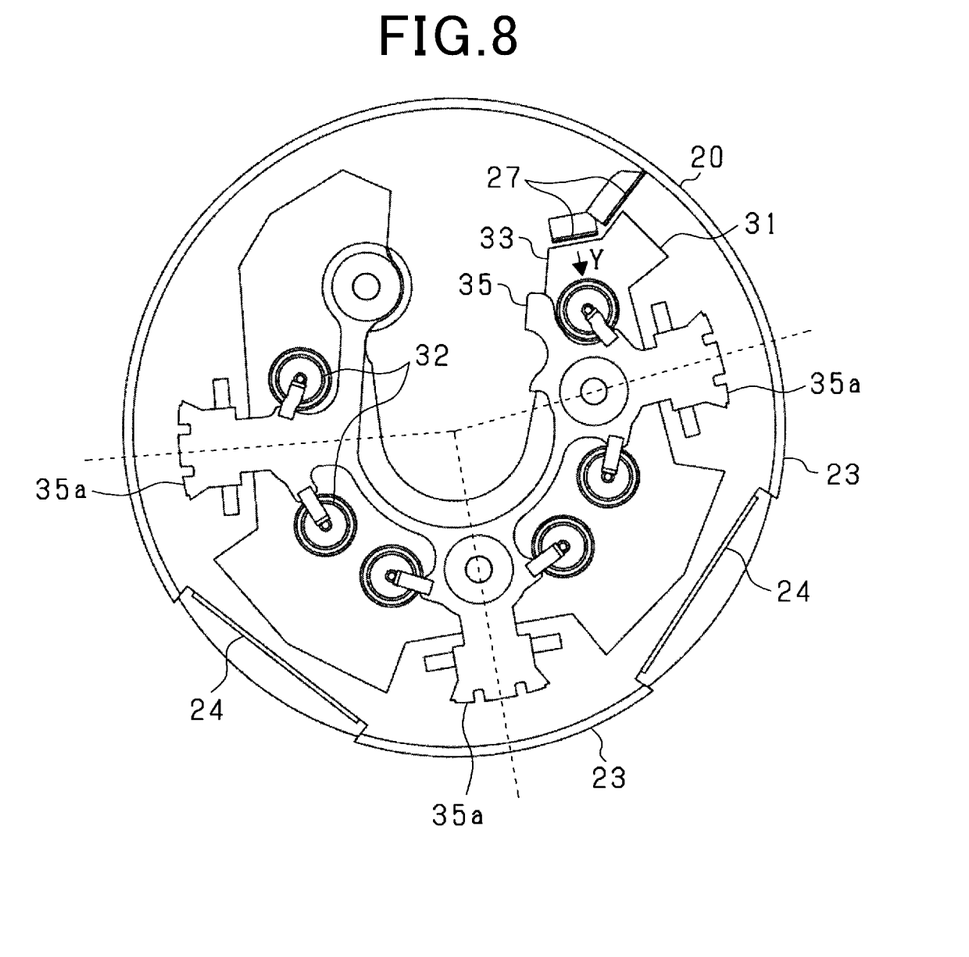
FIG. 8 is a back view of a state where the positive electrode side member is inside the rear cover as viewed from the inside of the rear cover.

FIG. 5 is a perspective view of the positive electrode side member 31. The positive electrode side member 31 is provided with a bus bar 35 connecting the plurality of positive electrode side diodes 32. The bus bar 35 has a plurality of protruding units 35a that extend in the direction in which the positive electrode side heat sink 33 and the negative electrode side heat sink 43 are arranged. The protruding units 35a are provided at positions that are separated from each other in the circumferential direction. The entire bus bar 35 is shown in FIG. 8. The protruding units 35a correspond to "a plurality of holding units" that hold the heat sinks 33 and 43 in a state where they are separated by a certain distance.

Further, the rear cover 20 is a member provided on the axially outer side of the rear frame 16 so as to cover the rectifier 30, and it has a top plate 21 and a peripheral wall 22 extending from the periphery thereof. The rear cover 20 may be made of an impact resistant material such as a mixture of nylon and an elastomer. The rear cover 20 is fixed with respect to the rear frame 16 by fastening provided by a plurality of fixing members 26 at the top plate 21. The peripheral wall 22 is provided so as to extend in the direction in which the positive electrode side heat sink 33 and the negative electrode side heat sink 43 are arranged (that is, in the axial direction).

In a rotating electric machine 10 mounted on a vehicle, an external force may be applied to the rear cover 20 due to collision of the vehicle or the like. Then, the rectifier 30 may be deformed together with the rear cover 20 by the external force, which may cause the members having a potential difference in the rectifier 30 (i.e., the positive electrode side heat sink 33 and the negative electrode side heat sink 43) to contact and cause a short circuit.

Thus, in the present embodiment, as a measure against short circuit in the rectifier 30, an easily deformable portion is provided in the rear cover 20, and when the rear cover 20 is deformed by an external force, the easily deformable portion contacts with the negative electrode side heat sink 43 and slides into the space between the positive electrode side heat sink 33 and the negative electrode side heat sink 43.

Figure 6:
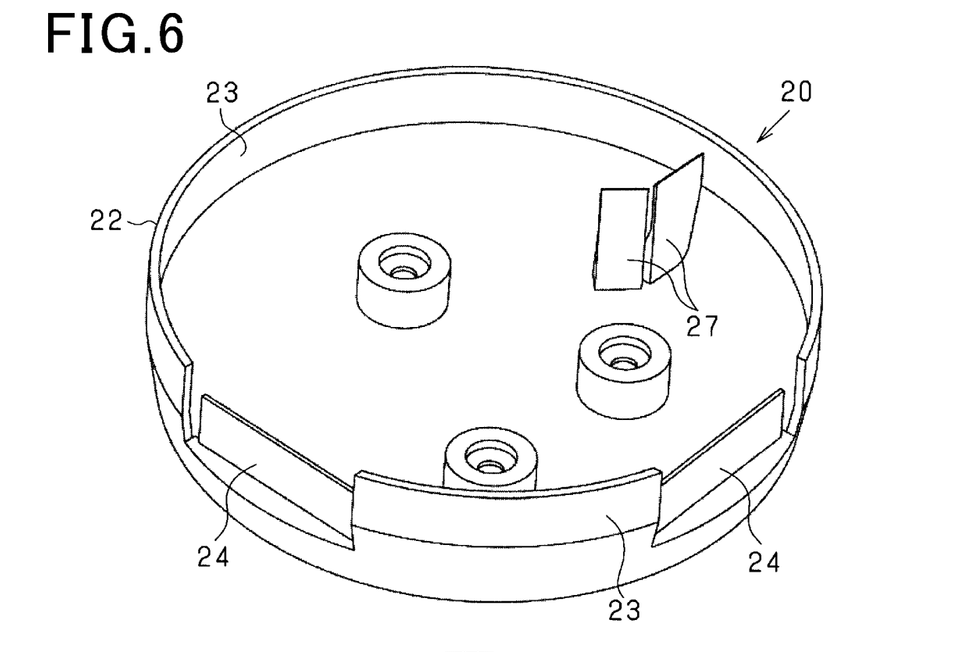
FIG. 6 is a perspective view of the rear cover as viewed from inside.
Figure 7:
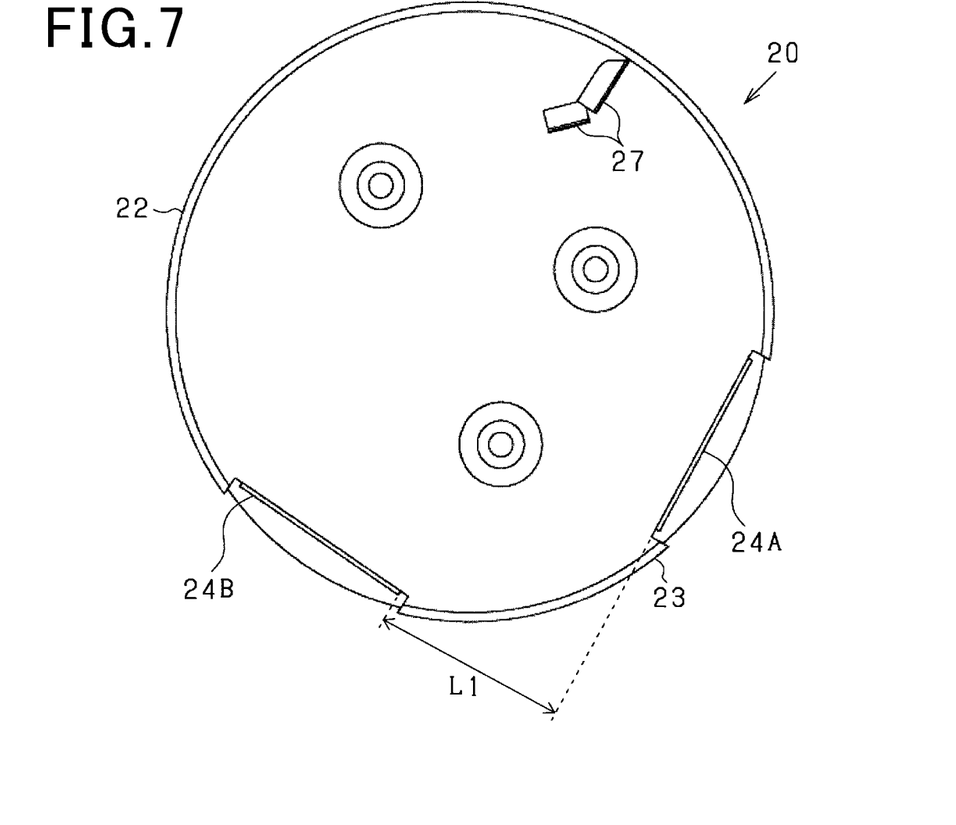
FIG. 7 is a back view of the rear cover as viewed from inside.

FIG. 6 is a perspective view of the rear cover 20 as viewed from the inside, FIG. 7 is a back view of the rear cover 20 as viewed from the inside, and FIG. 8 is a back view as viewed from the inside in a state where the positive electrode side member 31 is put inside the rear cover 20. The peripheral wall 22 has a first wall portion 23 extending circumferentially and two second wall portions 24 provided at two locations where the first wall portion 23 does not exist in the peripheral wall 22.

That is, the peripheral wall 22 is provided with a part (non-existing part) where the first wall portion 23 is interrupted at at least one location in the circumferential direction, and the second wall portions 24 are provided at that part. Each of the second wall portions 24 correspond to the "easily deformable portion". The first wall portion 23 has a circumferential shape in the circumferential direction, whereas each of the second wall portions 24 is a planar unit with a plate-like form. The first wall portion 23 and each of the second wall portions 24 are separated from each other in the circumferential direction.

The first wall portion 23 and each of the second wall portions 24 have different heights in the height direction of the rear cover 20 (that is, the axial direction), and the first wall portion 23 is higher than each of the second wall portions 24. Further, as viewed in the radial direction of the rear cover 20, the first wall portion 23 is disposed on the outer side, and the second wall portions 24 are disposed on the inner side.

Accordingly, as shown in FIG. 2, in a state where the rear cover 20 is attached to the rear frame 16, each of the second wall portions 24 is located such that its tip end portion on the lower end side (rear frame side tip end portion) faces an end face of the rear frame 16, and the first wall portion 23 is located such that its tip end portion on the lower end side extends along the outer peripheral surface of the rear frame 16. In short, the first wall portion 23 that forms the part of the peripheral wall 22 other than the second wall portions 24 is separated with respect to each of the second wall portions 24 in the circumferential direction, and further it is provided on the outer side of the outer peripheral surface of the rear frame 16 so as to extend along the outer peripheral surface.

Here, the tip end of each of second wall portions 24 and the rear frame 16 (specifically, the negative electrode side heat sink 43) are separated from each other in the axial direction by a gap therebetween that forms a vent 25. Thus, air can move inside and outside the cover through the vent 25. That is, cooling air is taken into the rear cover 20 through the vent 25, whereby the cooling performance of the rectifier 30 is improved.

Each of the second wall portions 24 serving as the easily deformable portion comes into contact with the negative electrode side heat sink 43 of the rear frame 16 when the rear cover 20 is deformed by an external force, and then it slides into the space between the positive electrode side heat sink 33 and the negative electrode side heat sink 43.

Figure 9:
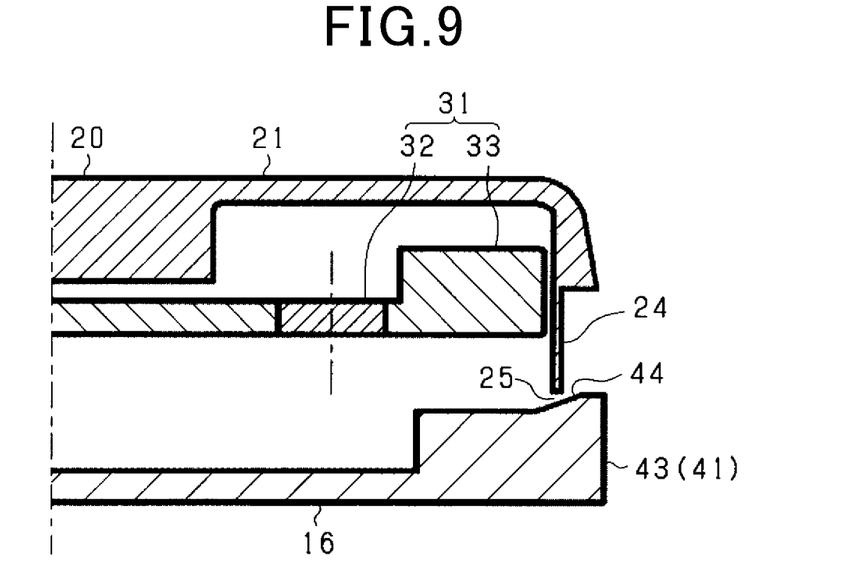
FIG. 9 is a cross-sectional view showing the positional relationship of the rear cover, a positive electrode side heat sink of the positive electrode side member, and a negative electrode side heat sink of the rectifier.

Specifically, as shown in FIG. 9, the negative electrode side heat sink 43 includes an inclined guide unit 44 for guiding the tip end portion of each of the second wall portions 24 to the space between the positive electrode side heat sink 33 and the negative electrode side heat sink 43 when the tip end portion contacts with the negative electrode side heat sink 43. The inclined guide unit 44 has an inclined face that is inclined such that the outer side of the rear frame 16 is closer to the tip end portion of each of the second wall portions 24 than the inner side thereof, and the inclined face may be flat or curved in a concave form.

The plurality of (two in the present embodiment) second wall portions 24 are provided such that they each extend along the outer periphery of the rear cover 20 and at a different angle, and one of the second wall portions 24 is disposed at a position separated by a certain distance from the other of the second wall portions 24 in the direction orthogonal to one of second wall portions 24.

Referring to FIG. 7, two second wall portions 24A and 24B are provided so as to extend along the outer periphery of the rear cover 20 and at different angles. Further, for example, the second wall portion 24A is provided at a distance L1 from the second wall portion 24B in the orthogonal direction. The distance L1 is preferably longer than at least the axial height of the second wall portions 24. The same applies to the position of the second wall portion 24B relative to the second wall portion 24A. Furthermore, as shown in FIG. 8, the first wall portion 23 of the peripheral wall 22 is provided at a position on the outer side of the protruding units 35a, and the second wall portions 24 are provided at positions on the outer side of the positions between adjacent protruding units 35a.

According to the above-described configuration of the rear cover 20, for example, when the second wall portion 24A is to be deformed in the orthogonal direction, the second wall portion 24B does not hinder the deformation. In addition, since the first wall portion 23 is provided at a position on the outer side of the protruding portions 35a, and the second wall portions 24 are provided at positions on the outer side of positions between adjacent protruding portions 35a, the second wall portions 24 can be provided in the peripheral wall 22 taking into consideration the difference in the risk of a short circuit based on the existence/absence of the protruding portions 35a.

The rotating electric machine 10 configured as described above is in such state as shown in FIG. 9 in its normal state, and the positive electrode side heat sink 33 and the negative electrode side heat sink 43 are separated from each other in the axial direction (vertical direction in the drawing). Further, in this state, the negative electrode side heat sink 43 and the tip end of the second wall portions 24 are also separated from each other, and cooling air is taken into the rear cover 20 through the vent therebetween.

Figure 10:
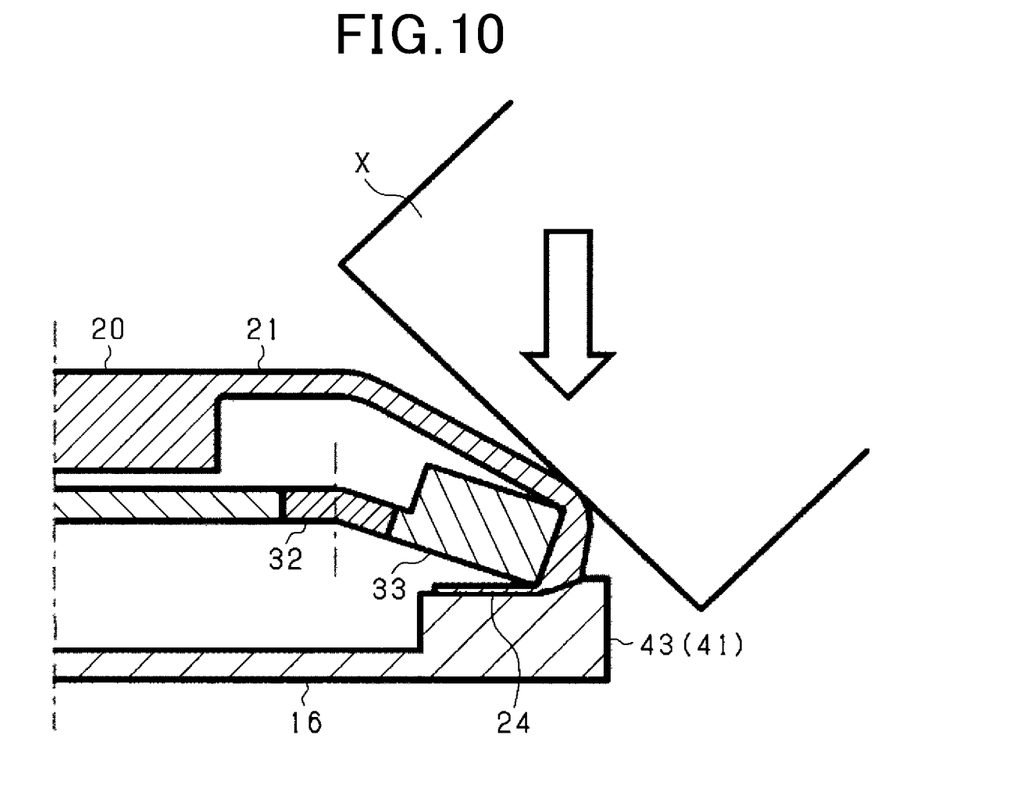
FIG. 10 is a cross-sectional view showing a state where an external force is applied to the rear cover.

Then, when an external force is applied to the rear cover 20 due to collision of the vehicle or the like, the rear cover 20 is crushed by the colliding object X as shown in FIG. 10. At this time, along with the deformation of the rear cover 20, the inclined guide unit 44 of the negative electrode side heat sink 43 guides the second wall portions 24 into the gap between the positive electrode side heat sink 33 and the negative electrode side heat sink 43. Thus, even if the positive electrode side heat sink 33 is crushed together with the rear cover 20 and bends toward the negative electrode side heat sink 43, it is possible to prevent contact (short circuit) between the positive electrode side heat sink 33 and the negative electrode side heat sink 43.

At the time of deformation of the rear cover 20 due to an external force, bending of the top plate 21 of the rear cover 20 causes the second wall portions 24 to inward in the radial direction, and then the tip end portion hits the negative electrode side heat sink 43. It can be considered that the bending of the top plate 21 occurs according to the positions at which the top plate 21 are fixed by the fixing units 26. That is, the top plate 21 is deformed on the outer side of the fixing positions of the fixing units 26. In this case, the second wall portions 24 can be easily guided into the gap between the positive electrode side heat sink 33 and the negative electrode side heat sink 43 also by the inclination of the second wall portions 24 with respect to the axial direction.

Figure 11:
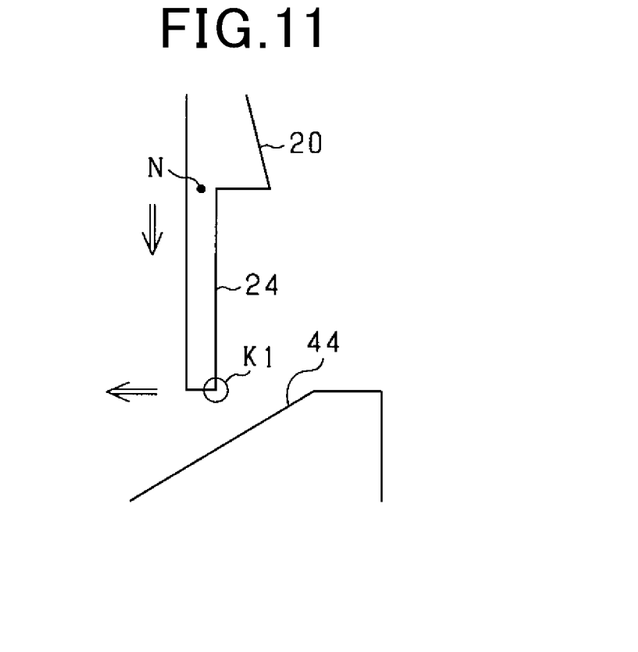
FIG. 11 is a diagram showing a second wall portion of the rear cover.

The deformation of the second wall portions 24 will be additionally described below. The tip end face of each of the second wall portions 24 is, for example, an orthogonal face orthogonal to the vertical direction as shown in FIG. 11. In this case, when an external force is applied to the rear cover 20 and a force is applied to the second wall portions 24 from their base end side, the tip end face of each of the second wall portions 24 approaches the negative electrode side heat sink 43. When the tip end face of each of the second wall portions 24 contacts with the negative electrode side heat sink 43, the side of the tip end face of each of the second wall portions 24 that is closer to the inclined guide unit 44, that is, the corner portion K1 on the cover outer side contacts with the inclined guide unit 44.

At this time, a rotational force toward the gap between the positive electrode side heat sink 33 and the negative electrode side heat sink 43 (a rotational force in the clockwise direction in FIG. 11) and around the base end portion N of each of the second wall portions 24 is applied to each of the second wall portions 24. As a result, when the rear cover 20 is deformed by an external force, the second wall portions 24 properly enter the gap between the positive electrode side heat sink 33 and the negative electrode side heat sink 43.

In the above configuration, the tip end portion of each of the second wall portions 24 and the negative electrode side heat sink 43 are separated from each other before the deformation of the rear cover 20, and when the rear cover 20 is deformed, the tip end portion contact with the negative electrode side heat sink 43 in a state where the second wall portions 24 are inclined inward in the radial direction. However, for example, if the tip end portion of the second wall portion 24 and the negative electrode side heat sink 43 are in contact before the rear cover 20 is deformed, or the gap is small, the second wall portions 24 may hit the negative electrode side heat sink 43 without being inclined inward in the radial direction.

In this case, as described with reference to FIG. 11, a rotational force toward the gap between the positive electrode side heat sink 33 and the negative electrode side heat sink 43 and around the base end portion N of each of the second wall portions 24 is applied to each of the second wall portions 24, and the second wall portions 24 can be deformed as desired.

Here, as described above, since the second wall portions 24 have a flat plate-like form, in contrast to the case where the second wall portions 24 have a circumferentially-curved plate form, the deformation of the second wall portions 24 would not be hindered, and the second wall portions 24 can suitably slide into the gap between the positive electrode side heat sink 33 and the negative electrode side heat sink 43.

Further, as shown in FIG. 6 and FIG. 7, the rear cover 20 is provided with an inside wall 27 located on the inner side of the peripheral wall 22. As with the peripheral wall 22, the inside wall 27 is provided so as to extend in the direction in which the positive electrode side heat sink 33 and the negative electrode side heat sink 43 are arranged (that is, in the axial direction). As shown in FIG. 8, the positive electrode side heat sink 33 is disposed beside the inside wall 27.

The inside wall 27 configures the "easily deformable portion". For example, as with the second wall portions 24 shown in FIG. 9, at a position of the negative electrode side heat sink 43 facing the tip end portion of the inside wall 27, an inclined guide unit is provided that guides the tip end portion of the inside wall 27 to the gap between the positive electrode side heat sink 33 and the negative electrode side heat sink 43 when the tip end portion hits the negative electrode side heat sink 43. The inclined guide unit has an inclined face that is flat or curved in a concave form.

According to this configuration, when the rear cover 20 is deformed by an external force, the inside wall 27 hits the negative electrode side heat sink 43 and bends toward the positive electrode side heat sink 33 (in the Y direction in FIG. 8), and then enters the gap between the positive electrode side heat sink 33 and the negative electrode side heat sink 43.

According to the embodiment described above, the following advantageous effects can be obtained.

The peripheral wall 22 of the rear cover 20 is provided with the second wall portions 24 as easily deformable portions, and when the rear cover 20 is deformed by an external force, the second wall portions 24 hit the negative electrode side heat sink 43 and then enters the gap between the positive electrode side heat sink 33 and the negative electrode side heat sink 43. Thus, it is possible to suppress short circuit due to contact between members having a potential difference.

Further, since the second wall portions 24 forming a part of the peripheral wall 22 are easily deformable portions, as compared with the configuration in which the easily deformable portions are provided inside the cover, a factor that obstructs the flow of cooling air that has entered the rear cover 20 can be reduced, and thus a decrease in the cooling performance of the rectifier 30 can be suppressed. As a result, it is possible to properly take measures against short circuit in the rectifier 30.

Since the negative electrode side heat sink 43 is provided with the inclined guide unit 44 for guiding the tip end portion of each of the second wall portions 24 into the gap between the positive electrode side heat sink 33 and the negative electrode side heat sink 43, appropriate insulation can be realized in the rectifier 30.

The second wall portions 24 and the negative electrode side heat sink 43 are configured such that the force applied from the base end side of each of the second wall portions 24 following the application of an external force to the rear cover 20 causes a force toward the gap between the positive electrode side heat sink 33 and the negative electrode side heat sink 43 at the tip end portion of each of the second wall portions 24. As a result, when the rear cover 20 is deformed by an external force, the second wall portions 24 properly enter the gap between the positive electrode side heat sink 33 and the negative electrode side heat sink 43.

When an external force is applied to the rear cover 20, the top plate 21 is deformed on the outer side of the fixing positions of the fixing units 26, and thus the second wall portions 24 will be inclined toward the inside of the rear cover 20. Therefore, it is possible to cause the second wall portions 24 to properly enter the gap between the positive electrode side heat sink 33 and the negative electrode side heat sink 43.

Since the tip end of the second wall portions 24 and the negative electrode side heat sink 43 are separated from each other and the space therebetween serves as the vent 25, the cooling performance of the rectifier 30 can be improved.

Since each of the second wall portions 24 is a flat plate, the deformation of each of the second wall portions 24 is less likely to be impeded compared to the case where each of the second wall portions 24 is a circumferentially curved plate. Thus, the short circuit prevention of the positive electrode side heat sink 33 and the negative electrode side heat sink 43 can be achieved suitably.

The plurality of second wall portions 24 that are flat plates extend at different angles along the periphery of the rear cover 20. One second wall portions 24 is provided at a certain distance from another second wall portion 24 in a direction orthogonal to one of the second wall portion 24. In this case, when one second wall portion 24 is to be deformed along with deformation of the rear cover 20, another second wall portion 24 would not hinder the deformation. Therefore, appropriate measures against short circuit in the rectifier 30 can be realized.

The first wall portion 23 of the peripheral wall 22 is separated from the second wall portions 24 in the circumferential direction, and further it is provided on the outer side of the outer peripheral surface of the rear frame 16 so as to extend along the outer peripheral surface. In this case, although the first wall portion 23 and the second wall portions 24 are located on the outer side of the rear frame 16 to enclose the space in which the rectifier 30 is accommodated, the first wall portion 23 would not contact with the rear frame 16 to hinder the deformation of the rear cover 20, that is, hinder the deformation of the second wall portions 24.

The first wall portion 23 of the peripheral wall 22 is provided at a position on the outer side of the protruding units 35a serving as holding units, and the second wall portions 24 are provided at positions on the outer side of the positions between adjacent protruding units 35a. Therefore, it is possible to realize a configuration that is suitable as the peripheral wall 22 of the rear cover 20 while taking into consideration the difference in the possibility of the different parts of the positive electrode side heat sink 33 to contact with the negative electrode side heat sink 43.

An opposing portion of the rear frame 16 facing the positive electrode side heat sink 33 is configured as the negative electrode side heat sink 43. In this case, since a part of the rear frame 16 can be used as the negative electrode side member 41, the configuration of the rotating electric machine 10 can be simplified. Further, when the rear cover 20 is deformed by an external force, thanks to the deformation of the second wall portions 24 caused by the opposing portion of the rear frame 16, a short circuit between the positive electrode side heat sink 33 and the negative electrode side heat sink 43 can be suitably suppressed.

Since the inner side wall 27 serving as the easily deformable portion is provided inside the peripheral wall 22 of the rear cover 20, it is possible to realize appropriate measures against short circuit other than the peripheral wall 22 of the rear cover 20.

Other Embodiments

The above-described embodiments may be modified, for example, as follows.
(First Modification)
The following configuration may be adopted as the configuration for making the second wall portion 24 as the easily deformable portion enters the gap between the positive electrode side heat sink 33 and the negative electrode side heat sink 43.

Figure 12:
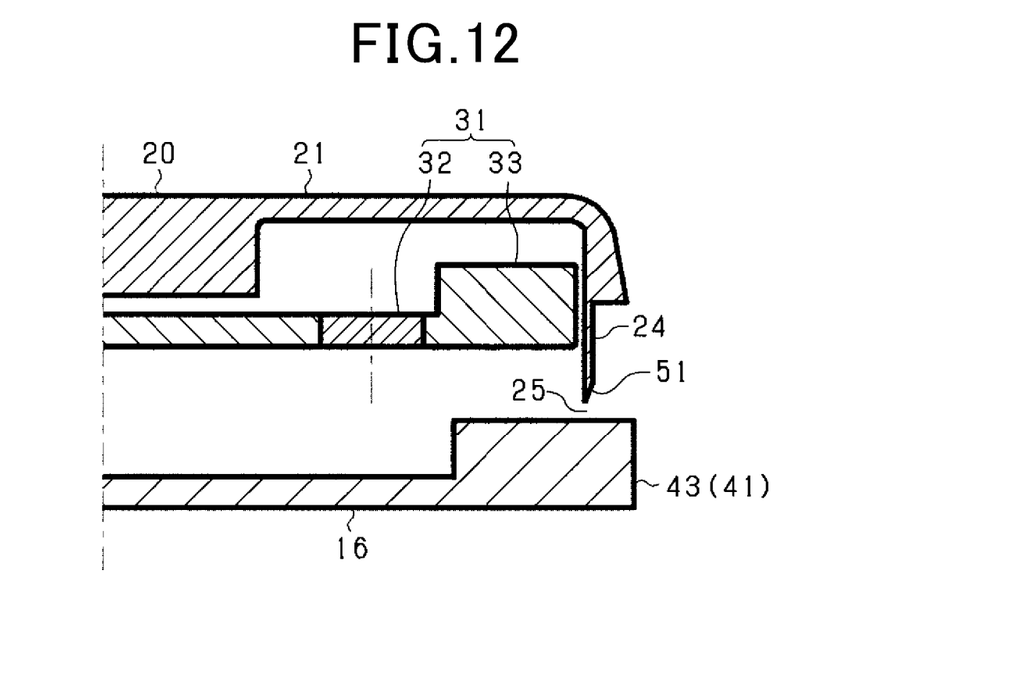
FIG. 12 is a cross-sectional view showing the positional relationship of the rear cover, the positive electrode side heat sink, and the negative electrode side heat sink according to a first modification.

The configuration of FIG. 12 is different from that of FIG. 9 in that the upper surface (the surface facing the positive electrode side heat sink 33) of the negative electrode side heat sink 43 is a flat surface with no inclination, and in that the tip end portion of the second wall portion 24 is provided with a tip end slope 51 for guiding the second wall portions 24 into the gap between the positive electrode side heat sink 33 and the negative electrode side heat sink 43.

The tip end slope 51 is configured by forming, of the two side faces, i.e., the outer side face on the cover outer side and the inner side face on the cover inner side, the outer side face as an inclined face. Thus, when the second wall portions 24 contact with the upper surface of the negative electrode side heat sink 43, the second wall portions 24 will be guided inside the cover, that is, into the gap between the positive electrode side heat sink 33 and the negative electrode side heat sink 43.

Figure 13:
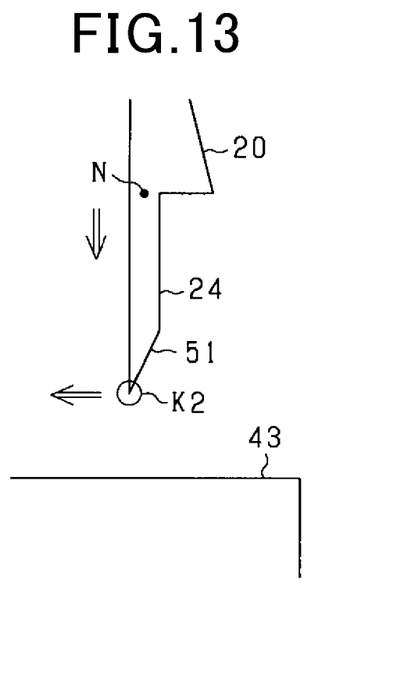
FIG. 13 is a diagram showing the second wall portion of the rear cover.

The deformation of each of the second wall portions 24 having the configuration of FIG. 12 will be described further with reference to FIG. 13. In FIG. 13, when an external force is applied to the rear cover 20 and a force is applied to the second wall portions 24 from their base end side, the tip end slope 51 of each of the second wall portions 24 approaches the negative electrode side heat sink 43. When the tip end slope 51 contacts with the negative electrode side heat sink 43, the corner portion K2 (the corner portion K2 on the cover inner side) at the tip of the tip end slope 51 hits the upper surface of the negative electrode side heat sink 43.

At this time, since the corner portion K2 is on the cover inner side (the side located between the positive electrode side heat sink 33 and the negative electrode side heat sink 43), a rotational force toward the gap between the positive electrode side heat sink 33 and the negative electrode side heat sink 43 (a rotational force in the clockwise direction in FIG. 11) and around the base end portion N of each of the second wall portions 24 is applied to each of the second wall portions 24. As a result, when the rear cover 20 is deformed by an external force, the second wall portions 24 properly enter the gap between the positive electrode side heat sink 33 and the negative electrode side heat sink 43.

The configuration of FIG. 12 can also realize appropriate insulation in the rectifier 30 as described above.
(Second Modification)
The tip end portion of each of the second wall portions 24 may be inclined or curved toward the cover inner side. In the configuration shown in FIG. 14, an inclined portion 52 is provided at the tip end portion of each of the second wall portions 24. It is also possible to provide the inclined portion 52 at an intermediate part instead of the tip end portion of each of the second wall portions 24, or the tip end portion of each of the second wall portions 24 may be configured as the inclined portion 52.

Figure 14:
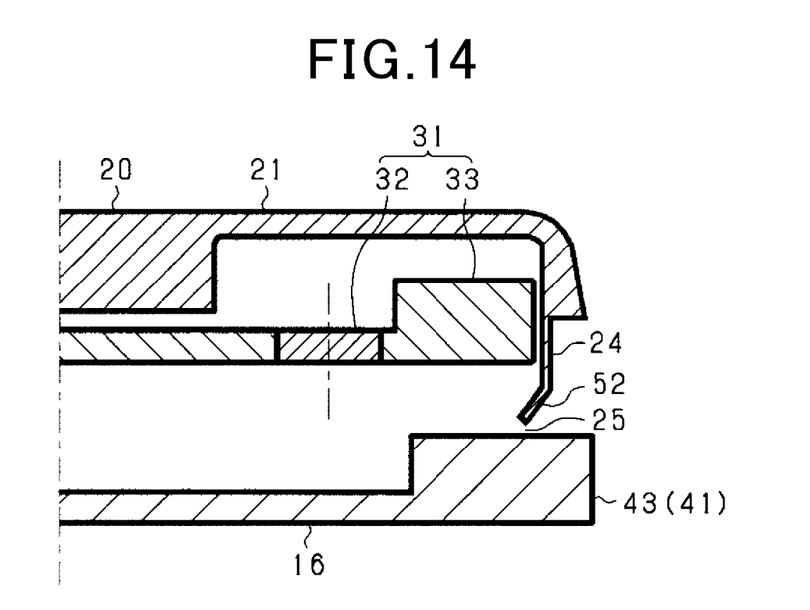
FIG. 14 is a cross-sectional view showing the positional relationship of the rear cover, the positive electrode side heat sink, and the negative electrode side heat sink according to a second modification.

Similarly in this configuration, the force applied from the base end side of each of the second wall portions 24 following the application of an external force to the rear cover 20 causes a force toward the gap between the positive electrode side heat sink 33 and the negative electrode side heat sink 43 at the tip end portion of the second wall portion 24. As a result, when the rear cover 20 is deformed by an external force, the second wall portions 24 properly enter the gap between the positive electrode side heat sink 33 and the negative electrode side heat sink 43.

The rotating electric machine 10 may also adopt at least two of the configuration in which the inclined guide units 44 are provided on the upper surface of the negative electrode side heat sink 43 (the configuration of FIG. 9), the configuration in which the tip end slope 51 is provided at the tip of each of the second wall portions 24 (the configuration of FIG. 12), and the configuration in which the inclined portion 52 is provided to each of the second wall portions 24 (the configuration of FIG. 14). The same applies to the inside wall 27 serving as the easily deformable portion.

The easily deformable portion preferably has a flat form like the second wall portion 24 and the inside wall 27 described in the above embodiments (see FIG. 8). If the easily deformable portion has a flat form, the second moment of area against bending would be smaller than that in the case of a curved form, and the desired deformation, that is, the deformation for entering the gap between the positive electrode side heat sink 33 and the negative electrode side heat sink 43 can be achieved more easily. However, depending on the external force expected to be applied, the easily deformable portion may have a curved form, and the flat or curved easily deformable portion may further be provided with a feature for reducing the second moment of area, for example, a groove extending in the circumferential direction.

The second wall portions 24 (the easily deformable portion) may be broken or torn when the rear cover 20 is deformed by an external force so as to be interposed between the positive electrode side heat sink 33 and the negative electrode side heat sink 43. Short circuit can also be prevented in such cases.

Figure 15:
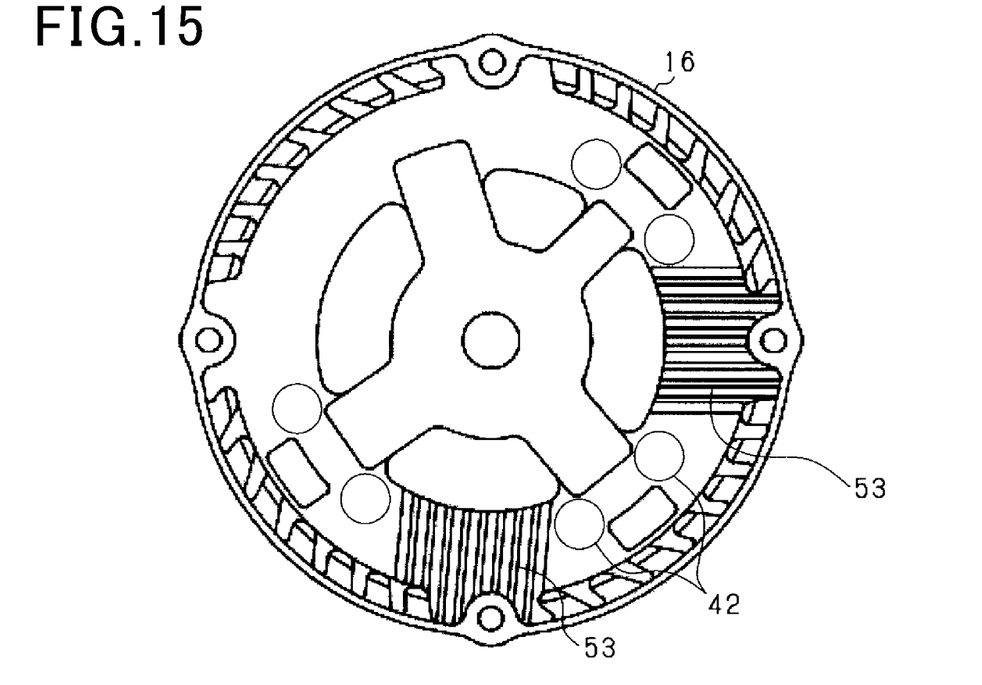
FIG. 15 is a diagram showing the configuration of the back side of the rear frame.

In the negative electrode side heat sink 43, heat dissipating ribs may be formed on the back of the contact face with which the tip end portion of the second wall portion 24 contact. That is, in FIG. 15, the heat radiation ribs 53 are provided respectively at the two positions corresponding to the second wall portions 24 on the back of the rear frame 16. In this case, the cooling performance of the negative electrode side diodes 42 can be improved.

(Third Modification)

Figure 16:
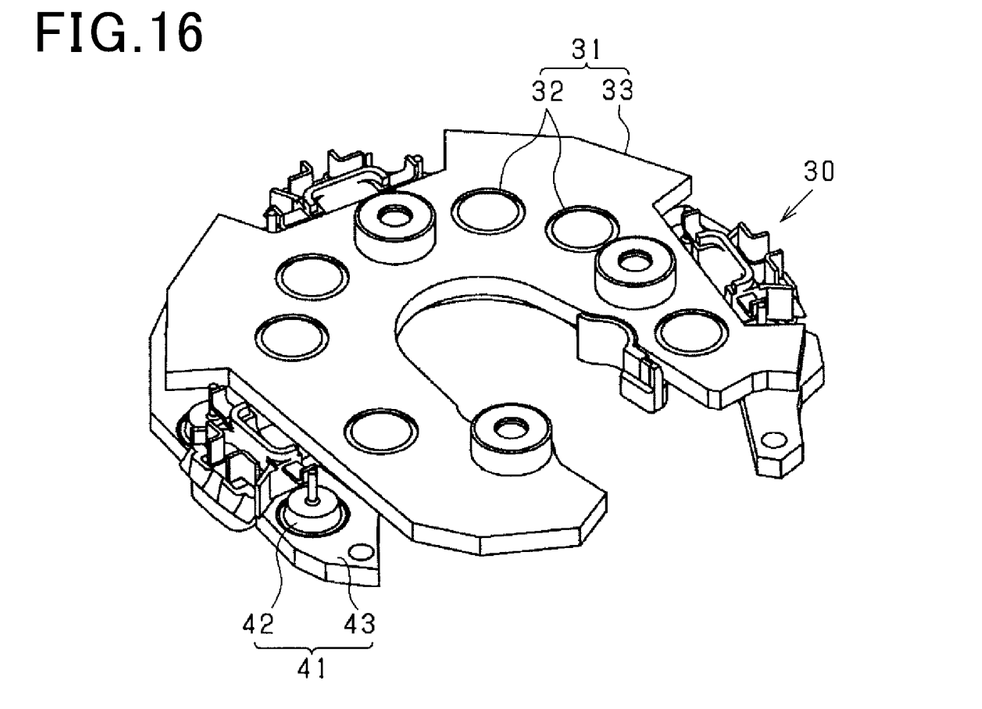
FIG. 16 is a perspective view showing the rectifier according to a third modification.

Although the negative electrode side member 41 of the rectifier 30 is configured using a part of the rear frame 16 in the above embodiments, this configuration may be changed. For example, as shown in FIG. 16, the rectifier 30 may be configured using a negative electrode side member 41 provided separately from the rear frame 16. In this case, the negative electrode side member 41 is fixed to the rear frame 16.

In the above embodiments, in the rectifier 30, the protruding units 35a of the bus bar 35 are "holding units", but this may be changed. For example, a plurality of connecting units for connecting the positive electrode side heat sink 33 and the negative electrode side heat sink 43 with a gap therebetween may serve as the "holding units".

The above embodiments are configured such that the second wall portions 24 prevent a short circuit between the positive electrode side heat sink 33 and the negative electrode side heat sink 43, but this configuration may be changed. For example, in the configuration having the negative electrode side member 41 of the rectifier 30 separately from the rear frame 16 (for example, the configuration of FIG. 13), the second wall portions 24 may prevent a short circuit between the positive electrode side heat sink 33 and the rear frame 16. In any case, it suffices if the configuration can prevent a short circuit with the non-positive electrode side member having a potential difference with respect to the positive electrode side heat sink 33.

Although the present disclosure is described based on examples, it should be understood that the present disclosure is not limited to the examples and structures. The present disclosure encompasses various modifications and variations within the scope of equivalence. In addition, the scope of the present disclosure and the spirit include other combinations and embodiments, only one component thereof, and other combinations and embodiments that are more than that or less than that.

What is claimed is:

1. A rotating electric machine comprising:
   a rotor that is fixed to a rotation shaft;
   a stator that generates an alternating current as the rotor rotates;
   a frame member that holds the rotor and the stator;
   a rectifier that is fixed to an outer side of the frame member and constituting a rectification circuit that rectifies the alternating current generated by the stator; and
   an insulating cover that is provided so as to cover the rectifier, wherein
   the rectifier comprises a positive electrode side member that includes a positive electrode side rectification element connected to a power supply side, and a positive electrode side heat sink to which the positive electrode side rectification element is fixed and charged positively,
   the positive electrode side heat sink is disposed so as to face a non-positive electrode side member with a gap between the positive electrode side heat sink and the non-positive electrode side member, the non-positive electrode side member having a potential difference with respect to the positive electrode side heat sink, and
   the insulating cover includes at least one wall portion that extends in a direction in which the positive electrode side heat sink and the non-positive electrode side member are arranged, the at least one wall portion functioning as at least one easily deformable portion that, when the insulating cover is deformed by an external force, contacts with the non-positive electrode side member and enters the gap between the positive electrode side heat sink and the non-positive electrode side member.

2. The rotating electric machine according to claim 1, wherein:
   the easily deformable portion and the non-positive electrode side member are configured such that a force applied from a base end side of the easily deformable portion following application of an external force to the insulating cover causes a force toward the gap between the positive electrode side heat sink and the non-positive electrode side member at a tip end portion of the easily deformable portion.

3. The rotating electric machine according to claim 1, wherein:
   the non-positive electrode side member comprises an inclined guide unit that guides a tip end portion of the easily deformable portion into the gap between the positive electrode side heat sink and the non-positive electrode side member.

4. The rotating electric machine according to claim 2, wherein:
   the non-positive electrode side member comprises an inclined guide unit that guides a tip end portion of the easily deformable portion into the gap between the positive electrode side heat sink and the non-positive electrode side member.

5. The rotating electric machine according to claim 1, wherein:
   a tip end portion of the easily deformable portion is provided with a tip end slope that guides the easily deformable portion into the gap between the positive electrode side heat sink and the non-positive electrode side member.

6. The rotating electric machine according to claim 2, wherein:
   a tip end portion of the easily deformable portion is provided with a tip end slope that guides the easily deformable portion into the gap between the positive electrode side heat sink and the non-positive electrode side member.

7. The rotating electric machine according to claim 3, wherein:
   a tip end portion of the easily deformable portion is provided with a tip end slope that guides the easily deformable portion into the gap between the positive electrode side heat sink and the non-positive electrode side member.

8. The rotating electric machine according to claim 4, wherein:
   a tip end portion of the easily deformable portion is provided with a tip end slope that guides the easily deformable portion into the gap between the positive electrode side heat sink and the non-positive electrode side member.

9. The rotating electric machine according to claim 1, wherein:
the insulating cover has a top plate that faces the positive electrode side heat sink and is fixed by a fixing unit, and
when an external force is applied to the insulating cover, the top plate is deformed on an outer side of a fixing position of the fixing unit such that the easily deformable portion is inclined toward the inside of the insulating cover.

10. The electric rotating machine according to claim 1, wherein:
the easily deformable portion is a flat plate-like portion.

11. The rotating electrical machine according to claim 1, wherein:
the insulating cover comprises a peripheral wall that includes the easily deformable portion.

12. The electric rotating machine according to claim 11, wherein:
the non-positive electrode side member and the tip end portion of the easily deformable portion are separated from each other by a gap therebetween that forms a vent.

13. The electric rotating machine according to claim 11, wherein:
the easily deformable portion is a flat plate-like portion.

14. The electric rotating machine according to claim 13, wherein:
the easily deformable portion comprises a plurality of easily deformable portions that extend along a periphery of the insulating cover at different angles; and
the plurality of easily deformable portions comprising first and second easily deformable portions, in which the first easily deformable portion is at a certain distance from the second easily deformable portion in a direction orthogonal to the first easily deformable portion.

15. The electric rotating machine according to claim 14, wherein:
a wall portion that forms a part of the peripheral wall other than the plurality of easily deformable portions is separated from the easily deformable portions in a circumferential direction, and is provided on an outer side of an outer peripheral surface of the frame member so as to extend along the outer peripheral surface.

16. The electric rotating machine according to claim 15, wherein:
the rectifier has a plurality of holding portions that extend in the direction in which the positive electrode side heat sink and the non-positive electrode side member are arranged and are configured to hold these two members with a certain distance therebetween; and
the wall portion that forms the part of the peripheral wall other than the easily deformable portions is provided at a position on an outer side of the holding portions, and the easily deformable portions are provided at positions on an outer side of positions between adjacent holding portions.

17. The electric rotating machine according to claim 1, wherein:
an inside wall is provided on an inner side of a peripheral wall of the insulating cover; and
the inside wall is an easily deformable portion that, when the insulating cover is deformed by an external force, contacts with the non-positive electrode side member and enters the gap between the positive electrode side heat sink and the non-positive electrode side member.

18. The electric rotating machine according to claim 1, wherein:
the rectifier further comprises a negative electrode side member including a negative electrode side rectification element connected to a ground side, and a negative electrode side heat sink to which the negative electrode side rectification element is fixed;
the negative electrode side member is the non-positive electrode side member; and
when the insulating cover is deformed by an external force, a tip end portion of the wall portion on the side of the negative electrode side heat sink contacts with the negative electrode side heat sink and the wall portion enters the gap between the positive electrode side heat sink and the negative electrode side heat sink.

19. The rotating electric machine according to claim 18, wherein:
the negative electrode side heat sink is configured by an opposing portion of the frame member opposing the positive electrode side heat sink.

20. The rotating electric machine according to claim 18, wherein:
a heat dissipation rib is formed on the back of a contact face of the negative electrode side heat sink with which the tip end portion of the easily deformable portion contacts.

* * * * *